United States Patent [19]

Ross

[11] Patent Number: 5,018,636
[45] Date of Patent: May 28, 1991

[54] SAFETY MUG FOR LIQUIDS WITH IMPROVED TOP WHICH PERMITS THE LIQUID TO RETAIN ITS TEMPERATURE WHILE IT IS IN THE MUG AND FURTHER RETAIN THE LIQUID IF THE MUG IS BUMPED

[76] Inventor: Gary Ross, 140 Oxnard Ave., Oxnard, Calif. 93003

[21] Appl. No.: 556,627

[22] Filed: Jul. 23, 1990

[51] Int. Cl.$^5$ .................... B65D 41/26; B65D 41/30
[52] U.S. Cl. .................... 220/90.4; 220/94 R; 220/307; 220/352; 215/307; 222/569; 222/570
[58] Field of Search ............ 222/563, 569, 570; 220/90.2, 90.4, 307, 95, 94 R, 352; 215/307

[56] References Cited

U.S. PATENT DOCUMENTS

| 692,802 | 2/1902 | Strope | 220/95 |
|---|---|---|---|
| 1,550,618 | 8/1925 | Kemp | 220/94 R |
| 1,950,840 | 8/1960 | Franz | 220/95 |
| 2,358,600 | 9/1944 | Selten | 220/90.4 |
| 2,529,114 | 11/1950 | Tellier | 220/90.4 |
| 2,601,767 | 7/1952 | Wall | 220/90.4 |
| 2,625,019 | 1/1953 | Brown | 220/90.4 |
| 3,121,310 | 2/1964 | Rice | 220/307 |
| 3,360,161 | 12/1967 | Smith | 220/90.4 |
| 3,443,712 | 5/1969 | Hauser | 220/352 |
| 3,578,195 | 5/1971 | Ogle | 215/307 |
| 4,582,218 | 4/1986 | Ross | 220/90.4 |
| 4,606,474 | 8/1986 | Dudzik | 220/307 |
| 4,883,194 | 11/1989 | Fernandes | 220/307 |

Primary Examiner—Stephen Marcus
Assistant Examiner—S. Castellano
Attorney, Agent, or Firm—Thomas I. Rozsa

[57] ABSTRACT

The present invention relates to a container for liquid which is able to retain the liquid therein for drinking purposes at a temperature close to its original temperature for a period of time. The design of the top makes it easy to insert, reduces vents to one drink hole, and the addition of an interior shelf or speed bump will add additional important insurance against spills or splashes while improving the heat retention. The improved shape will allow a mechanical channel for an add on handle which will reduce breakage and add marketing options. The improved shape will also allow the possibility of the jiggering of the mug.

10 Claims, 1 Drawing Sheet

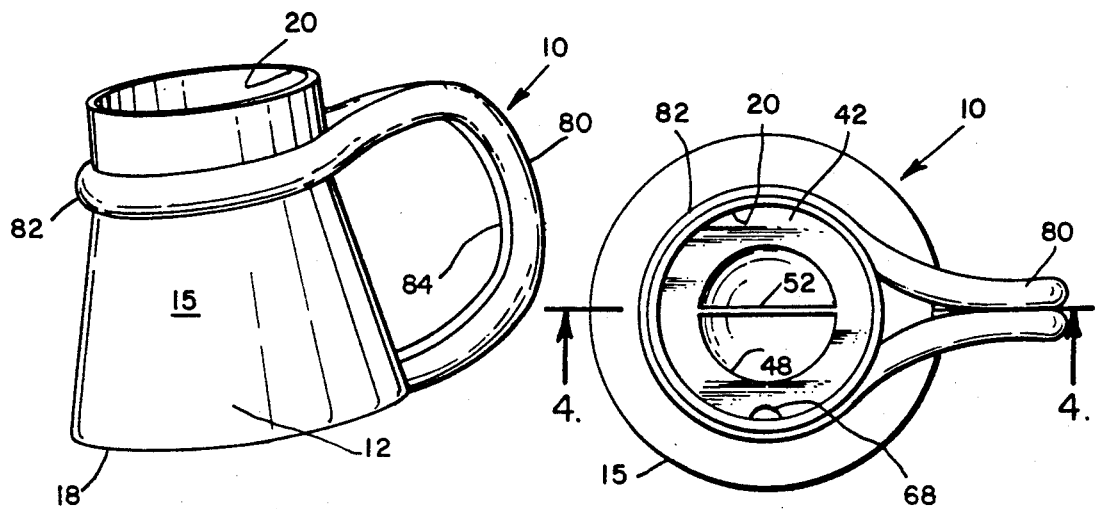
Fig. 1.
Fig. 2
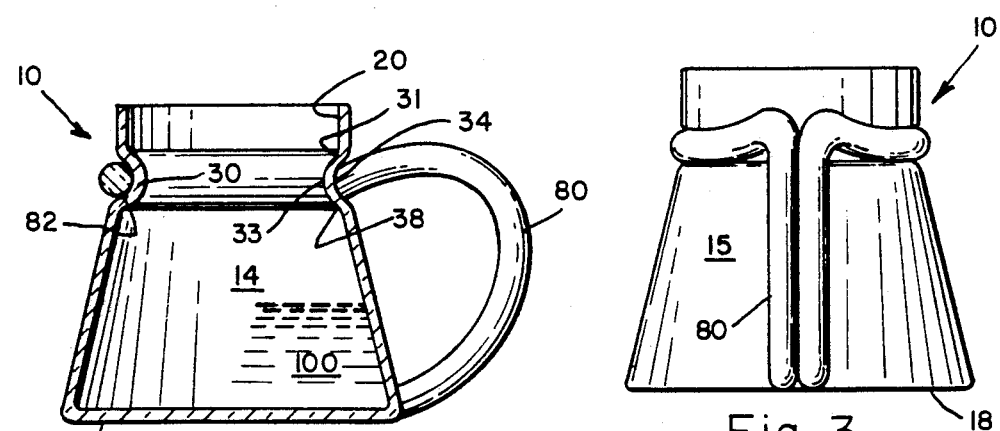
Fig. 4.
Fig. 3.
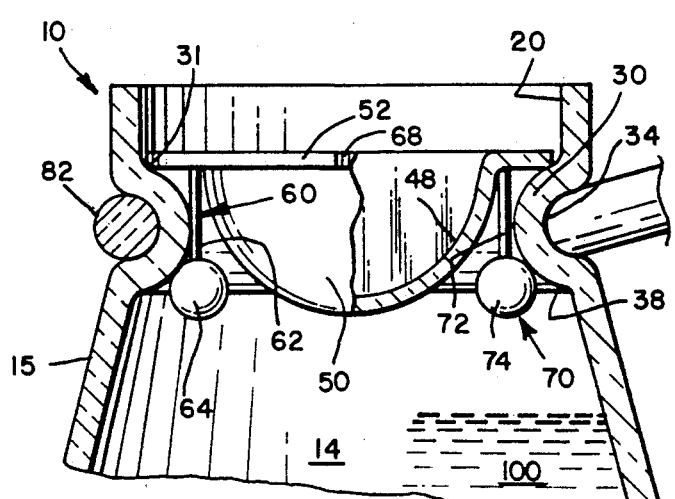
Fig. 5.
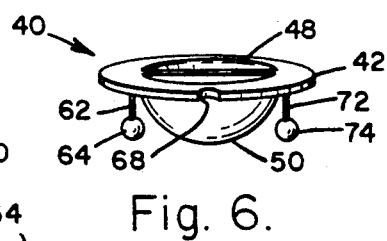
Fig. 6.
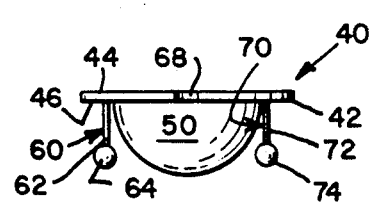
Fig. 7.

SAFETY MUG FOR LIQUIDS WITH IMPROVED TOP WHICH PERMITS THE LIQUID TO RETAIN ITS TEMPERATURE WHILE IT IS IN THE MUG AND FURTHER RETAIN THE LIQUID IF THE MUG IS BUMPED

BACKGROUND OF THE INVENTION

1. Field of the Invention

The present invention relates to containers for liquids which permit the liquid to remain hot or cold while it is retained in the container and further permit the user to drink the liquid from the container. The present invention further relates to removable sealing means on a container which assist in retaining the liquid in the container so that liquid will not spill out should the container accidentally be bumped.

2. Description of the Prior Art

In general, containers which keep a liquid contained therein at almost their original temperature for several hours are known in the prior art. These containers are called vacuum bottles and are comprised of two walls enclosing a vacuum chamber therebetween and fitted with a metal outer case. The vacuum bottle is completely sealed at its opening by means of a screw cap or cork. Liquid is conventionally dispensed from the vacuum bottle into a cup. While it is possible for one to drink directly from a vacuum bottle, it is not commonly done since the opening is not intended to function as a drinking lip and liquid can easily spill out during the drinking process.

Conventional glasses, cups and mugs are commonly used to hold liquids for drinking purposes. However, their tops are completely open. As a result, the liquid can be retained at its original temperature for only a short period of time. In addition, if the container should accidentally be tipped, the liquid contained therein will spill out.

The inventor, Gary Ross, is also the inventor of the invention disclosed and claimed in U.S. Pat. No. 4,582,218 issued on Apr. 15, 1986 for Safety Mug For Liquids Which Permits The Liquid To Retain Its Temperature While It Is In The Mug And Further Retain The Liquid If The Mug Is Tipped. The present invention is an improvement on this prior invention and in particular is an improvement in the mug body design to facilitate ease of manufacture and further is an improvement in the top which provides better sealing and more efficient insertion and removal.

SUMMARY OF THE PRESENT INVENTION

The present invention relates to a container for liquid which is able to retain the liquid therein for drinking purposes at a temperature close to its original temperature for a period of time, will assure that the liquid will be difficult to spill if the container is bumped, and facilitates easy drinking of the liquid from the container.

It has been discovered, according to the present invention, that if a container is designed with an interiorly recessed shelf which accommodates a sealing member or top which contains a pair of spring like extensions each terminating in a stop means such as a sphere, then the extensions and sphere can be inserted into the mug and be bent inwardly to extend around the shelf such that the top lies flush against the upper edge of the interior shelf while the spheres rest just below the shelf and retain the top against the sphere, then the top can function as a sealing member to retain the liquid in place and assure that the liquid will not spill if the container is accidentally bumped. The top will further serve to seal the container to thereby retain the liquid therein at close to its original temperature for a period of time.

It has also been discovered, according to the present invention, that if the sealing member or top contains a gap or opening in its outer perimeter, then a user can drink liquid out of it like any other mug. At the same time, most of the top remains sealed to facilitate retaining the liquid at near its original temperature for a period of time.

It has also been discovered, according to the present invention, that if the shelf is recessed into the container by a sufficient distance such that the top is also recessed into the container, the top is substantially stabilized and will not be easily knocked out of its position. In addition, if the handle portion of the top is recessed into a well in the top, the top can be more easily inserted into the container and rotated about the internal supporting shelf.

It has further been discovered, according to the present invention, that if the exterior surface of the mug contains an interior channel which corresponds to the interior shelf inside the mug, then a plastic handle can be formed to be supported on the mug within the exterior channel and thereby permits a multiplicity of color designed handles which are a different color from the mug itself.

It has also been discovered that if a mug has only an interior shelf and an exterior channel in its surface without a handle, then a handle can be later attached by a plastic handle accommodated and supported by the exterior channel. This will eliminate broken handles in transit which is a common problem. It will also simplify the manufacturing process. The improved exterior shape has a groove that is continuous around the mug. That change now allows the possibility of a jiggering process for the manufacture of this shape. A special spinning form is inserted into the mold and the inside is carved out. This process will produce a mug within minutes as opposed to a couple of hours which is required for a casting process. The prior mug in U.S. Pat. No. 4,582,218 had to be cast because of the shape of the discontinuous groove.

It is therefore an object of the present invention to provide a container for liquid which is able to retain the liquid therein for drinking purposes at a temperature close to its original temperature for a period of time. The improved shape of this mug now has a sort of "speed bump" that any liquid must go around before it gets to the drink hole. The mug in U.S. Pat. No. 4,582,218 has the space between the grooves that the liquid can travel up and out of the mug if the mug is bumped. The new shape with the continuous groove or bump on the inside forces any liquid to take a circuitous route before exiting the mug. This improved design allows for only one drink hole, as the user will simply put the top on in accordance with his or her drinking preference. The prior art, with its fixed exits had to accommodate the possibility of a left handed drinker and in order to avoid the confusion of twisting the top around and around, the top was fitted with two exits. The new design eliminates the need for the twisting in, and alignment of the drink holes of the top corresponding to the built in channels of the mug. Therefore, the entire process is greatly simplified and actually improved by eliminating an unnecessary exit that would lose heat and add the possibility of accident. The bump or interior shelf forces the liquid around it before it exits and further reduces the venting for heat retention of the liquid.

It is another object of the present invention to provide a simple but effective design for an internal shelf combined with a novel top having flexible engaging means which retain the top.

It is an additional object of the present invention to provide the mug design with an easier insertion of the top, with its improved heat retention and splash reduction and the added benefit of the option of a lower cost more efficient manufacturing process. This is in addition to the improved marketing aspect of the add on handle and elimination of breakage problems in transit.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

FIG. 1 is a perspective view of the present invention temperature retaining safety mug with separate handle.

FIG. 2 is a top plan view of the present invention temperature retaining safety mug.

FIG. 3 is a rear elevational view of the present invention temperature retaining safety mug.

FIG. 4 is a cross-sectional view taken along line 4—4 of FIG. 2.

FIG. 5 is an enlarged partial cross-sectional view of the present invention temperature retaining safety mug with the lid or top in place with the pair of spheres result adjacent to lower edge of the internal shelf.

FIG. 6 is a front elevational view of the top sealing member or lid.

FIG. 7 is a side elevational view of the top sealing member or lid.

DETAILED DESCRIPTION OF THE PREFERRED EMBODIMENT

Although specific embodiments of the present invention will now be described with reference to the drawings, it should by understood that such embodiments are by way of example only and merely illustrative of but a small number of the many possible specific embodiments which can represent applications of the principles of the invention. Various changes and modifications which are obvious to one skilled in the art to which the invention pertains are deemed to be within the spirit, scope and contemplation of the invention as further defined in the appended claims.

A perspective view of the present invention temperature retaining safety mug 10 is shown in FIG. 1. The body portion 15 of the temperature retaining safety mug 10 comprises a side wall 12, and an internal chamber 14. In the embodiment shown in FIG. 1, the side wall of the lower portion of the temperature retaining safety mug 10 is generally in the shape of a frustum. This design serves to provide greater stability to the temperature retaining safety mug since the base 18 is wider than the upper portion of the temperature retaining safety mug 10. It is emphasized that other designs for the shape of the temperature retaining safety mug such as generally cylindrical are also within the spirit and scope of the present invention.

The present invention involves placing a protruding shelf 30 within the temperature retaining safety mug 10. The shelf 30 extends inwardly from the internal wall 20 of the mug 10 and extends unbroken around the entire circumference of internal wall 20. By way of example, if the mug is approximately four and one quarter inches tall, the shelf can be protruding such that its top is approximately one-half inch from the top of mug 10. It will be appreciated that any other protruding distance is also within the spirit and scope of the present invention. In the preferred embodiment, the body of the temperature retaining safety mug 10 is made of one piece construction with the shelf 30 molded as an integral part of the body. The side wall 12 of the temperature retaining safety mug 10 contains a groove or channel 34 at the location of the shelf 30. The purpose of this groove or channel 34 is to provide a means to support a separate handle member. In order to be properly sealed, the temperature retaining safety mug 10 should be filled to just below the level of the lower surface 38 of the shelf 30.

An important portion of the present invention is the mating sealing member or lid 40 which fits within the temperature retaining safety mug 10 and is rotatably retained by the internal shelf 30. As shown in FIGS. 5, 6 and 7, the sealing member or lid 40 is comprised of an circumferential disk 42 having a top surface 44 and a bottom surface 46. Disk 42 surrounds an interior well 48 which extends into a generally hemispherical body portion 50. Extends into and across the well 48 and terminating at diametrically opposite interior ends of the disk 42 is the handle 52. Therefore, a user can grasp the lip by placing his or her fingers into the well 48 and grasping the handle 52 with opposed fingers. The top or lid 40 further comprises an opposite disposed pair of flexible retaining means 60 and 70. First retaining means 60 further comprises a flexible elongated rod 62 which is attached to the lower surface 46 of disk 42 at one end and terminates in a flexible sphere 64 at its other end. Similarly, second retaining means 70 further comprises a flexible elongated rod 72 which is attached to the lower surface 46 of disk 42 at one end and terminates in a flexible sphere 74 at its other end. Although not required, in the preferred embodiment the pair of retaining means 60 and 70 are aligned with the handle 52. The disk 42 further includes a gap 68. In the preferred orientation, the gap 68 is set at approximately ninety degrees to each of the oppositely disposed retaining means 60 and 70. It is further emphasized that while a pair of oppositely disposed retaining means 60 and 70 are the preferred embodiment, it is also within the spirit and scope of the present invention to have any multiplicity of such retaining means incorporated into the top or lid 40. In operation, the top or lid 40 is inserted into the container or mug 10 such that the lower surface 46 of disk 42 rests on the upper portion 31 of interior shaft 30 which the flexible rods 62 and 72 bend inwardly and are press fit against the middle portion 33 of interior shelf 30. The flexible spheres 64 and 66 rest adjacent the lower portion 38 of shelf 30 and serve to retain the lid 40 tightly against the shaft 30 so that no liquid 100 which is inside chamber 14 of mug 10 will spill out, even if the mug 10 is bumped.

Liquid is therefore securely retained within the lower portion of chamber 14. When no liquid 100 is to be removed, the lid 40 is pressed onto the shelf 30 so that the spheres 64 and 74 rest adjacent the lower portion 38 of shelf 30 to slightly hold the disk 42 of lid 40 against the upper portion 31 of shelf 30. As a result, the lower chamber serves to retain the liquid at near its original temperature for at least twenty minutes. This is extremely useful when the liquid is hot coffee or a cold soda. When the user wishes to drink the liquid, the user merely drinks the liquid through the gap 68 in disk 42. Since this is only a small opening, the temperature of the liquid within is still maintained at close to its original temperature.

Another unique feature of the present invention is a separate handle 80 which is not formed as part of the mug body. The separate handle 80 can be made of plastic and has a generally cylindrical body 82 which is accommodated within and supported within the exterior channel 34 in the exterior wall 12 of mug 10. As illustrated in FIGS. 1 and 4, the handle 80 is disposed within the groove or channel 34 and curves around and extends into an arcuate portion 84 by which the handle 80 is gripped. By having this separate handle, breakage is reduced in shipping and the ceramic manufacturing is simplified by a simpler jiggering process which incorporates an exterior plaster mold. Clay is squeezed into the mold and the inside is carved out. This process will produce a mug within minutes as opposed to several hours with a cast mug. Therefore, the mug is less expensive to produce and consistent in shape. In addition, the separate plastic handle 80 enables the mug to be cast and painted in one color with the handle made in a second color.

The present invention may be more broadly defined as a mug comprising:
 a. a body member having a top and a bottom;
 b. said body member comprising an internal chamber bounded by an internal side wall;
 c. a protruding shelf located in said internal side wall of said body member and having an upper portion;
 d. said recessed shelf located at a fixed distance below the top of said body member and circumscribing the circumference of said internal side wall;
 e. a lid member further comprising a circumferential disk having a gap at a location on its circumference, a lower surface, and a lid handle;
 f. said lid member further comprising flexible retaining means;
 g. said lid being inserted into said body member such that the flexible retaining means causes the lid to be retained on the protruding shelf such that the lower surface of the circumferential disk of the lid rests against the upper portion of the protruding shelf to thereby seal the internal chamber portion located beneath the lid; and
 h. a handle.

By way of example, the mug 10 can be made of porcelain or other ceramic material. The handle 80 can be made of plastic material. The lid 40 can be made of either ceramic type material or made..of plastic material. The retaining means 60 and 70 can be made of spring stainless steel or plastic components with spring memory. Therefore, the rod 62 and the rod 72 can be made of spring steel or plastic with spring memory and the spheres 64 and 74 can be made of spring steel or plastic with spring memory.

Due to the tight fit of the lid, the temperature retaining safety mug can be jostled or tipped over without concern that the liquid therein will spill out.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the invention might be embodied or operated.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A mug comprising:
 a. a body member having a circumferential sidewall and a base, where the sidewall has an interior surface, and the base has a top surface and a flat bottom surface;
 b. said interior surface of said sidewall and said top surface of said base forming an internal chamber with a top opening;
 c. said interior surface of said sidewall being configured to have a protruding annular shelf with an upper portion and a lower portion, where the shelf is located adjacent to and spaced from said top opening of said body member;
 d. a lid member having a central hemisphere and a circumferential disk with a gap, where the hemisphere has a top concave surface forming a depression and a bottom convex surface, and the disk has a top surface and bottom surface;
 e. said lid member also having a bar mounted to said upper surface of said disk across said depression formed by said upper concave surface of said hemisphere; and
 f. said lid member further having two retaining means, where each retaining means has a flexible rod with an upper end mounted to said bottom surface of said disk and a lower end, and a sphere attached to the lower end of the rod of each respective retaining means;
 g. whereby said lid member can be retained in said body member by inserting said lid member into said body member from said top opening, such that said bottom surface of said disk rests onto said upper portion of said shelf, and each sphere of said retaining means is pressed against said lower portion of said shelf by the retention force of a respective one of said flexible rods of said retaining means, to thereby seal said internal chamber of said body member.

2. The invention as defined in claim 1 further comprising a handle member.

3. The invention as defined in claim 2 wherein said sidewall of said body member further comprises an exterior surface configured to have a recessed annular groove for retaining said handle member.

4. The invention as defined in claim 1 wherein said mug is a container for liquids.

5. The invention as defined in claim 1 wherein said gap in said disk of said lid member is spaced at approximately ninety degrees to said pair of oppositely disposed retaining means.

6. A mug comprising:

a. a body member having a circumferential sidewall and a base, where the sidewall has an interior surface and an exterior surface, and the base has a top surface and a flat bottom surface;
b. said interior surface of said sidewall and said top surface of said base forming an internal chamber with a top opening;
c. said interior surface of said sidewall being configured to have an inscribed protruding annular shelf with an upper portion, a middle portion and a lower portion, where the shelf is located at a fixed distance below said top opening of said body member;
d. a lid member having a central hemisphere and a circumferential disk with a gap, where the hemisphere has a top concave surface forming a depression and a bottom convex surface, and the disk has a top surface and bottom surface in conjunction with the upper surface and the bottom surface of the hemisphere respectively;
e. said lid member also having a bar mounted to said upper surface of said disc across said depression formed by said upper concave surface of said hemisphere; and
f. said lid member further having a pair of oppositely disposed retaining means, where each retaining means has a flexible rod with an upper end mounted to said bottom surface of said disk and a lower end, and a flexible sphere attached to the lower end of the rod of each respective retaining means;
g. whereby said lid member can be retained in said body member by inserting said lid member into said body member from said top opening, such that said bottom surface of said disk rests on said upper portion of said shelf, each of said flexible rods of said retaining means extends adjacent to said middle portion of said shelf, and each of said flexible spheres of said retaining means is pressed against said lower portion of said shelf by the retention force of a respective one of said flexible rods of said retaining means, to thereby seal said internal chamber of said body member.

7. The invention as defined in claim 6 further comprising a handle member.

8. The invention as defined in claim 7 wherein said exterior surface of said sidewall is configured to have a circumscribing recessed annular groove aligned with said shelf on said interior surface of said sidewall for retaining said handle member.

9. The invention as defined in claim 6 wherein said mug is a container for liquids.

10. The invention as defined in claim 6 wherein said gap in said disk of said lid member is spaced at approximately ninety degrees to said pair of oppositely disposed retaining means.

* * * * *